US010663797B2

United States Patent
Sasaki

(10) Patent No.: US 10,663,797 B2
(45) Date of Patent: May 26, 2020

(54) COMPOSITE OPTICAL SHEET, LIQUID CRYSTAL DISPLAY DEVICE USING SAME, AND METHOD FOR MANUFACTURING SAME

(71) Applicant: SAMSUNG ELECTRONICS CO., LTD., Suwon-si (KR)

(72) Inventor: Katsutoshi Sasaki, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/528,849

(22) PCT Filed: Dec. 10, 2015

(86) PCT No.: PCT/KR2015/013516
§ 371 (c)(1),
(2) Date: May 23, 2017

(87) PCT Pub. No.: WO2016/093638
PCT Pub. Date: Jun. 16, 2016

(65) Prior Publication Data
US 2017/0315406 A1    Nov. 2, 2017

(30) Foreign Application Priority Data

Dec. 12, 2014 (JP) .................................. 2014-251525
Nov. 9, 2015 (JP) .................................. 2015-219360

(51) Int. Cl.
G02B 5/04    (2006.01)
G02B 5/02    (2006.01)
(Continued)

(52) U.S. Cl.
CPC ..... *G02F 1/133606* (2013.01); *G02B 3/0012* (2013.01); *G02B 3/0056* (2013.01);
(Continued)

(58) Field of Classification Search
CPC ......... G02F 1/133606; G02F 1/133611; G02F 2001/133607; G02F 2001/133567;
(Continued)

(56) References Cited

U.S. PATENT DOCUMENTS 7,324,177 B2    1/2008    Kawanishi et al.
8,303,154 B2    11/2012   Ha et al.
(Continued)

FOREIGN PATENT DOCUMENTS

CN    1896777 A    1/2007
CN    101749595 A    6/2010
(Continued)

OTHER PUBLICATIONS

English language translation of WIPO patent publication WO 2014/0092507. Document downloaded from WIPO website at https://patentscope.wipo.int/search/en/search.jsf; translation into English performed by "Google Translate" tool onsite. (Year: 2014).*
(Continued)

*Primary Examiner* — Angela K Davison
(74) *Attorney, Agent, or Firm* — Sughrue Mion, PLLC

(57) ABSTRACT

Provide are a composite optical sheet used for a liquid crystal display (LCD) device and a method of manufacturing the composite optical sheet. The LCD device includes: a liquid crystal panel; a surface light-emitting module; a base layer disposed between the liquid crystal panel and the surface light-emitting module; a diffusion pattern layer disposed on a surface of the base layer facing the surface light-emitting module and configured to diffuse light incident from the surface light-emitting module; a prism pattern layer disposed on a surface of the base layer facing the liquid crystal panel and including a plurality of first unit prisms; and a prism film adhered to the prism pattern layer and including a plurality of second unit prisms.

19 Claims, 17 Drawing Sheets

(51) Int. Cl.
*G02F 1/13357* (2006.01)
*G02B 3/00* (2006.01)

(52) U.S. Cl.
CPC .......... *G02B 5/0221* (2013.01); *G02B 5/0231* (2013.01); *G02B 5/0242* (2013.01); *G02B 5/045* (2013.01); *G02F 2001/133607* (2013.01)

(58) Field of Classification Search
CPC ...... G02B 5/045; G02B 5/021; G02B 5/0215; G02B 5/0221; G02B 5/0226; G02B 5/0242
See application file for complete search history.

(56) References Cited

U.S. PATENT DOCUMENTS

| | | | |
|---|---|---|---|
| 8,645,719 B2 | 2/2014 | Lee | |
| 9,182,523 B2 | 11/2015 | Sung et al. | |
| 2001/0050736 A1* | 12/2001 | Lee | G02B 6/0051 349/65 |
| 2005/0224997 A1 | 10/2005 | Liao et al. | |
| 2006/0170319 A1* | 8/2006 | Oku | G02F 1/133504 313/116 |
| 2007/0008738 A1* | 1/2007 | Han | G02B 5/045 362/607 |
| 2007/0247562 A1* | 10/2007 | Shim | G02F 1/133606 349/64 |
| 2010/0142188 A1* | 6/2010 | Ha | G02B 3/0043 362/97.2 |
| 2010/0142220 A1* | 6/2010 | Lee | G02B 6/0053 362/609 |
| 2011/0234942 A1* | 9/2011 | Nakagome | G02B 5/0226 349/64 |
| 2012/0044440 A1 | 2/2012 | Yamahara et al. | |
| 2012/0257412 A1* | 10/2012 | Yeom | B05D 5/06 362/607 |
| 2013/0010234 A1* | 1/2013 | Sung | G02B 5/0231 349/95 |

FOREIGN PATENT DOCUMENTS

| | | |
|---|---|---|
| CN | 102866441 A | 1/2013 |
| JP | 2004-109964 A | 4/2004 |
| JP | 4316167 B2 | 8/2009 |
| JP | 2010-225314 A | 10/2010 |
| JP | 2010-256431 A | 11/2010 |
| JP | 2010-256889 A | 11/2010 |
| JP | 2012-108497 A | 6/2012 |
| JP | 2012-113097 A | 6/2012 |
| JP | 2013-15833 A | 1/2013 |
| KR | 10-2011-0136645 A | 1/2001 |
| KR | 10-2010-0056782 A | 5/2010 |
| KR | 10-2012-0085755 A | 8/2012 |
| KR | 10-2012-0090589 A | 8/2012 |
| KR | 10-2012-029461 A | 11/2012 |
| KR | 10-2013-0005330 A | 1/2013 |
| KR | 10-1280187 B1 | 6/2013 |
| KR | 10-2014-0077585 A | 6/2014 |

OTHER PUBLICATIONS

International Search Report and Written Opinion dated Mar. 24, 2016, issued by the International Searching Authority in counterpart International Application No. PCT/KR2015/013516 (PCT/ISA/210/237).
Communication dated Jun. 18, 2019 issued by the Japanese Patent Office in counterpart Japanese Patent Application No. 2015-219360.
Communication dated Dec. 25, 2019 issued by the State Intellectual Property Office of P.R. China in counterpart Chinese Patent Application No. 201580067539.1.

* cited by examiner

COMPOSITE OPTICAL SHEET, LIQUID CRYSTAL DISPLAY DEVICE USING SAME, AND METHOD FOR MANUFACTURING SAME

TECHNICAL FIELD

The present disclosure relates to a composite optical sheet used for a liquid crystal display (LCD) device, a liquid crystal display device using the composite optical sheet, and a method of manufacturing the composite optical sheet.

BACKGROUND ART

Recently, plasma display panels (PDPs), field emission display (FED) devices, and thin film transistor-liquid crystal display (TFT-LCD) devices have been developed as flat-panel display devices used for notebook computers, televisions (TVs), or mobile phones that require a thin design, a small size, and low power consumption. From among the flat-panel display devices, the LCD devices having good color reproduction and a thin design have been most actively studied.

Since the PDPs and the FED devices, from among the flat-panel display devices, may emit light by themselves whereas the LCD devices may not emit light by themselves, the LCD devices may display images by emitting light by using backlight units that are auxiliary light sources. In order to meet the demand that backlight units uniformly emit light to entire surfaces, the backlight units have edge-type or direct-type surface light source structures.

DETAILED DESCRIPTION OF THE INVENTION

Technical Problem

The present disclosure provides a composite optical sheet that may improve scattering characteristics at low cost without reducing luminance, a liquid crystal display (LCD) device using the composite optical sheet, and a method of manufacturing the composite optical sheet.

Technical Solution

A liquid crystal display (LCD) device according to an embodiment includes: a liquid crystal panel; a surface light-emitting module; a base layer disposed between the liquid crystal panel and the surface light-emitting module; a diffusion pattern layer disposed on a surface of the base layer facing the surface light-emitting module and configured to diffuse light incident from the surface light-emitting module; a prism pattern layer disposed on a surface of the base layer facing the liquid crystal panel and comprising a plurality of first unit prisms; and a prism film adhered to the prism pattern layer and comprising a plurality of second unit prisms.

Advantageous Effects of the Invention

A liquid crystal display (LCD) device according to an embodiment of the present disclosure may further improve scattering characteristics without reducing luminance.

Also, an LCD device according to an embodiment may uniformly emit light output from a light source to a liquid crystal panel.

Also, an LCD device according to another embodiment may enable a composite optical sheet to have a thin design and a light weight by adhering a plurality of films to each other, and may prevent luminance from being reduced due to the adhesion.

Also, an LCD device according to another further embodiment may absorb an impact applied to the LCD device by using a support and may prevent luminance from being reduced due to the support.

BEST MODE

Figure 1:
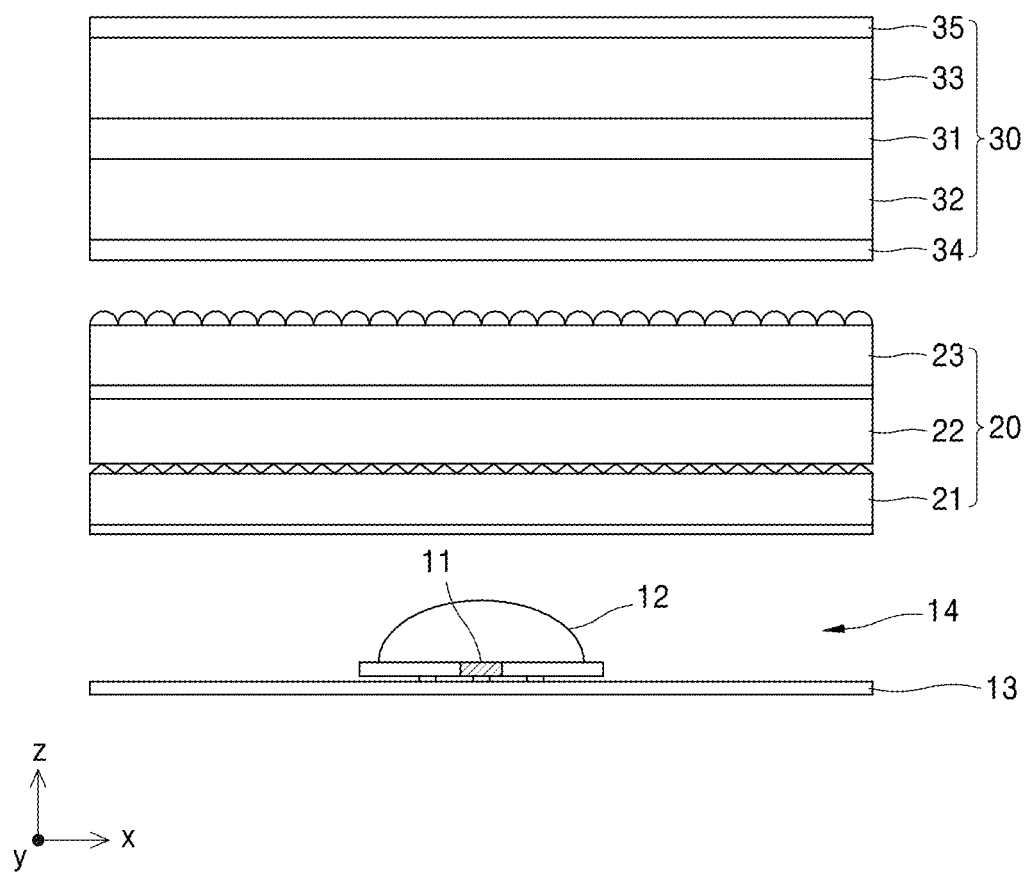
FIG. 1 is a cross-sectional view of a liquid crystal display (LCD) device according to an embodiment seen in a y-axis direction.

A liquid crystal display (LCD) device according to an embodiment includes: a liquid crystal panel; a surface light-emitting module; a base layer disposed between the liquid crystal panel and the surface light-emitting module; a diffusion pattern layer disposed on a surface of the base layer facing the surface light-emitting module and configured to diffuse light incident from the surface light-emitting module; a prism pattern layer disposed on a surface of the base layer facing the liquid crystal panel and including a plurality of first unit prisms; and a prism film adhered to the prism pattern layer and including a plurality of second unit prisms.

The LCD device may further include a microlens film adhered to the prism film and including a plurality of microlenses having convex shapes.

The LCD device may further include an adhesive layer configured to adhere the plurality of first unit prisms and the prism film.

The LCD device may further include an adhesive layer configured to adhere the plurality of second unit prisms and the microlens film.

The prism pattern layer may include a plurality of first prism patterns having a first height and a plurality of second prism patterns having a second height, wherein the first height is greater than the second height.

The plurality of first prism patterns may be adhered to the prism film by the adhesive layer, and the plurality of second prism patterns may be provided between the plurality of first prism patterns.

The prism pattern layer may include a plurality of first prism patterns having a first height and a plurality of second prism patterns having a second height, wherein the first height is greater than the second height.

The plurality of first prism patterns may be adhered to the microlens film by the adhesive layer, and the plurality of second prism patterns may be provided between the plurality of first prism patterns.

The base layer may include a plurality of scattering particles.

First ridgelines of the plurality of first unit prisms and second ridgelines of the plurality of second unit prisms may be perpendicular to each other.

The diffusion pattern layer may include a plurality of scattering particles.

The plurality of first unit prisms may have a depth ranging from 0.025 mm to 0.03 mm, wherein an angle between one side of a triangular cross-section perpendicular to a first ridgeline of each of the plurality of first unit prisms and a line passing through an apex of the triangular cross-section and perpendicular to a bottom side of the triangular cross-section ranges from 44° to 47°.

An interval between first ridgelines of the plurality of first unit prisms may range from 0.04 mm to 0.06 mm.

The base layer, the diffusion pattern layer, and the prism pattern layer may form a diffusion film, wherein a haze value of the diffusion film is equal to or greater than 80%.

The diffusion pattern layer may include a plurality of uneven portions.

The surface light-emitting module may include at least one from among an edge-type surface light-emitting module and a direct-type surface light-emitting module.

A liquid crystal display (LCD) device according to another embodiment includes: a liquid crystal panel; a surface light-emitting module; a diffusion film disposed between the liquid crystal panel and the surface light-emitting module; a first prism film adhered to a surface of the diffusion film facing the liquid crystal panel and including a plurality of first unit prisms; a second prism film adhered to a surface of the first prism film facing the liquid crystal panel and including a plurality of second unit prisms; and a support provided between the surface light-emitting module and the diffusion film, wherein the diffusion film includes: a base layer; a diffusion pattern layer disposed on a surface of the base layer facing the surface light-emitting module; and a diffraction pattern layer disposed on a surface of the base layer facing the liquid crystal panel.

The diffraction pattern layer may include at least one from among linear uneven patterns, a plurality of cylindrical patterns, and a plurality of trigonal pyramid patterns that are arranged in parallel.

The LCD device may further include a microlens film adhered to the second prism film and including a plurality of microlenses having convex shapes.

Mode of the Invention

Embodiments of the present invention will now be described more fully with reference to the accompanying drawings for one of ordinary skill in the art to be able to perform the present invention without any difficulty. The present invention may, however, be embodied in many different forms and should not be construed as being limited to the embodiments set forth herein. Also, parts in the drawings unrelated to the detailed description are omitted to ensure clarity of the present invention. Like reference numerals throughout the specification denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

FIG. 1 is a cross-sectional view of a liquid crystal display (LCD) device 1 according to an embodiment seen in a y-axis direction.

Referring to FIG. 1, the LCD device 1 includes a liquid crystal panel 30, a surface light-emitting module 14, and a composite optical axis 20.

In the following drawings, a direction parallel to a longitudinal direction of a screen (a top surface of the liquid crystal panel 30 close to an observer) of the LCD device 1 is referred to as an x-axis direction and a direction perpendicular to the x-axis direction is referred to as a y-axis direction. Also, a direction perpendicular to the screen of the LCD device 1 is referred to as a z-axis direction. Also, in the z-axis direction, a side close to the liquid crystal panel 30 is an observer side, and a side close to the surface light-emitting module 14 is a rear side. A film surface refers to a surface of a film constituting the composite optical sheet 20, that is, any of a diffusion film 21, a prism film 22, and a microlens film 23, in an in-plane direction.

The liquid crystal panel 30 includes one pair of transparent substrates 32 and 33 that face each other with a predetermined interval therebetween, a liquid crystal layer 31 formed by filling liquid crystals between the one pair of transparent substrates 32 and 33, and absorptive polarizing sheets 34 and 35 formed on top and bottom surfaces of the one pair of transparent substrates 32 and 33. A transparent electrode (not shown) or an alignment film (not shown) may be formed on each of the one pair of transparent substrates 32 and 33, and the liquid crystals of the liquid crystal layer 31 may be aligned by applying a voltage based on display data between the transparent electrodes. Operating modes of the liquid crystal panel 30 may include, but are not limited to, a twisted nematic (TN) mode, a super twisted nematic (STN) mode, an in-plane switching (IPS) mode, and a vertical alignment (VA) mode.

The absorptive polarizing sheets 34 and 35 may absorb one from among S-polarized light and P-polarized light and may selectively transmit the other polarized light.

Also, a phase difference sheet (not shown) may be formed between the one pair of transparent substrates 32 and 33 and the absorptive polarizing sheets 34 and 35.

The surface light-emitting module 14 is a direct-type surface light source device located at the rear side of the liquid crystal panel 30. The surface light-emitting module 14 includes a light source 11, a lens 12, and a reflective sheet 13.

The light source 11 that generates light may be any of various light sources such as a line light source lamp, a surface light source lamp, a cold-cathode fluorescent lamp (CCFL), and a light-emitting diode (LED). The lens 12 may be formed of, for example, an acrylic resin or a silicon resin. Light emitted from the light source 11 spreads out due to an optical operation of the lens 12. The reflective sheet 13 may reflect light emitted from the light source 11 and returning from the lens 12 or the optical sheet back to the liquid crystal panel 30.

Although the surface light-emitting module 14 includes only one light source 11 in FIG. 1, a plurality of the light sources 11 may be arranged at predetermined intervals. Also, the surface light-emitting module 14 may be an edge-type surface light-emitting module including a light guide plate and a light source located on a side surface of the light guide plate.

The composite optical sheet 20 may be located between the liquid crystal panel 30 and the surface light-emitting module 14. The composite optical sheet 20 includes the diffusion film 21, the prism film 22, and the microlens film 23.

Light emitted from the light source 11 is incident on the diffusion film 21. Light emitted from the diffusion film 21 is incident on the prism film 22 adhered to the diffusion film 21. The microlens film 23 adhered to the prism film 22 emits light output from the prism film 22 to the liquid crystal panel 30. A thickness of each of the diffusion film 21, the prism film 22, and the microlens film 23 may be hundreds of μm, for example, 100 μm.

Figure 2A:
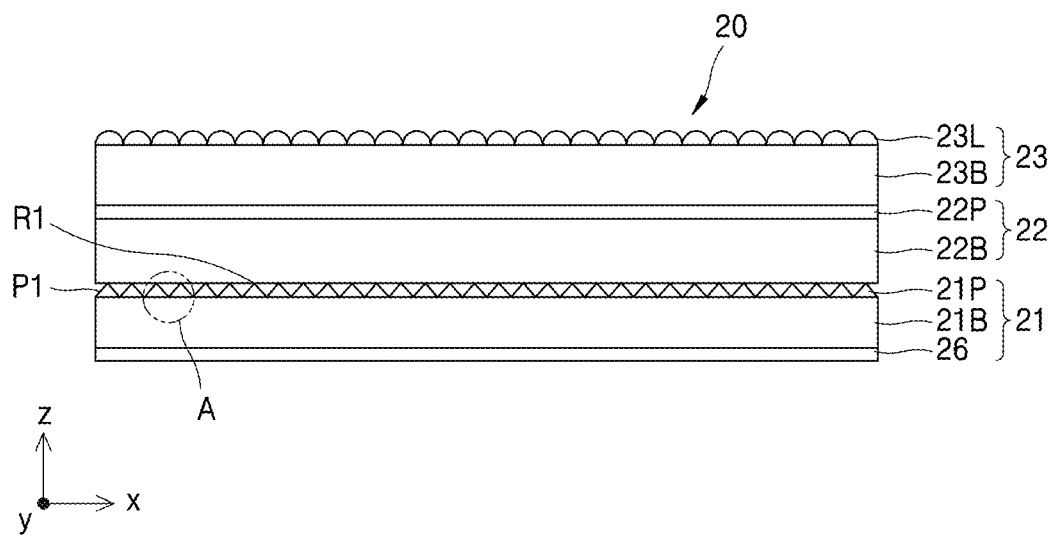
FIG. 2A is a cross-sectional view of a composite optical sheet according to an embodiment seen in the y-axis direction.
Figure 2B:
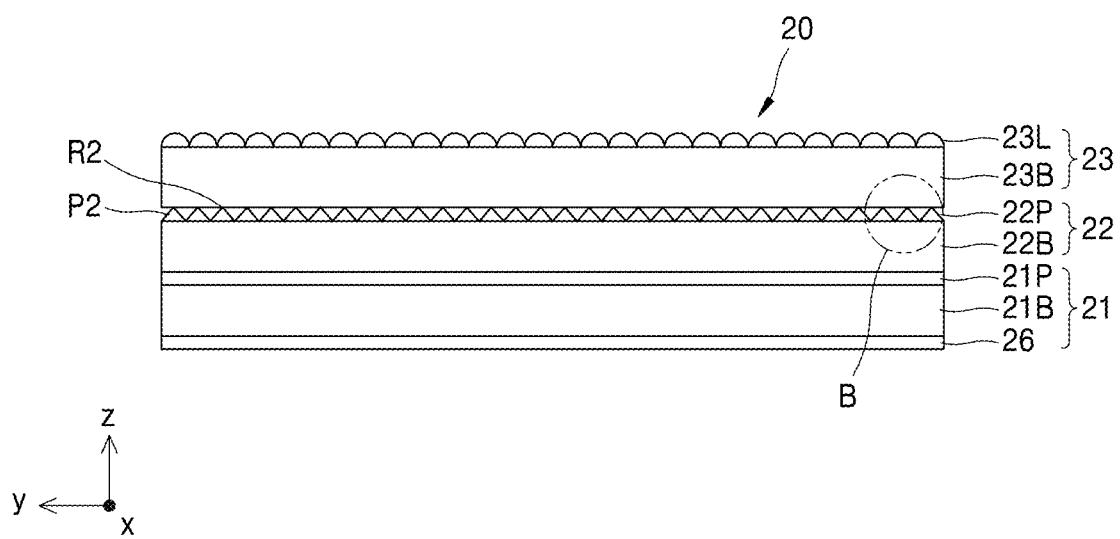
FIG. 2B is a cross-sectional view of the composite optical sheet according to an embodiment seen in an x-axis direction.
Figure 3:
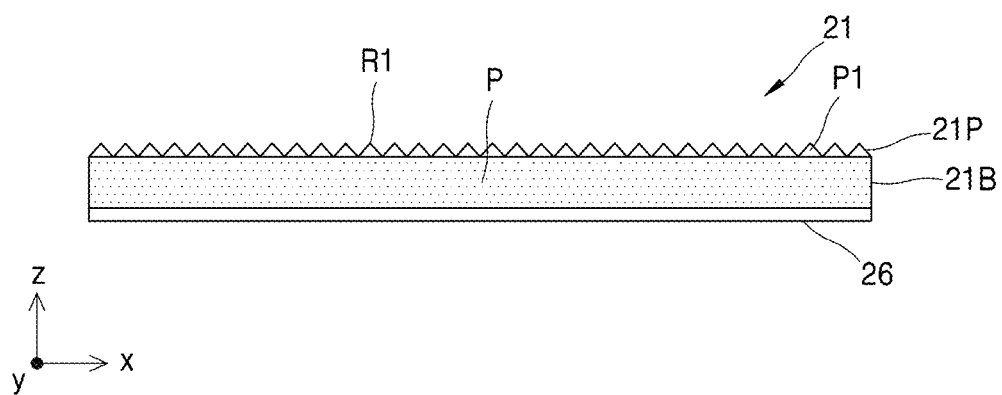
FIG. 3 is a cross-sectional view of a diffusion film according to an embodiment seen in the y-axis direction.
Figure 4:
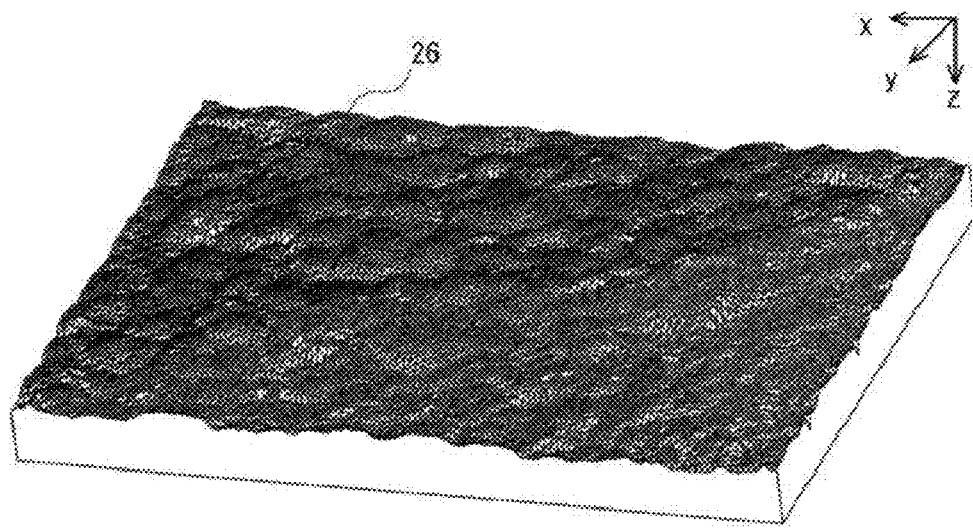
FIG. 4 is a view of a diffusion pattern layer of the diffusion film according to an embodiment.

FIG. 2A is a cross-sectional view of the composite optical sheet 20 according to an embodiment seen in the y-axis direction. FIG. 2B is a cross-sectional view of the composite optical sheet 20 according to an embodiment seen in the x-axis direction. FIG. 3 is a cross-sectional view of the diffusion film 21 according to an embodiment seen in the y-axis direction. FIG. 4 is a view of a diffusion pattern layer 26 of the diffusion film 21 according to an embodiment.

Referring to FIG. 2A, the composite optical sheet 20 includes the diffusion film 21, the prism film 22, and the microlens film 23, and the diffusion film 21, the prism film 22, and the microlens film 23 are sequentially stacked from the rear side to the observer side.

The diffusion film 21 may diffuse light emitted from the surface light-emitting module 14 inside the diffusion film 21. The diffusion film 21 includes a base layer 21B, the diffusion pattern layer 26 disposed on a surface of the base layer 21B facing the surface light-emitting module 14, and a prism pattern layer 21P disposed on a surface of the base layer 21B facing the liquid crystal panel 30.

The base layer 21B may be formed of an optically transparent resin such as polyethylene terephthalate (PET), polypropylene (PP), polycarbonate (PC), or poly(methyl methacrylate) (PMMA), and may transmit incident light. Also, referring to FIG. 3, the base layer 21B may include a plurality of scattering particles P therein. The scattering particles P may be formed of an acrylic resin or a styrene resin. The scattering particles P formed in the base layer 21B may emit light incident on the base layer 21B as light having low luminance non-uniformity.

The diffusion pattern layer 26 is disposed on a surface of the base layer 21B facing the surface light-emitting module 14. Referring to FIG. 4, the diffusion pattern layer 26 may have a plurality of uneven portions, and light incident on the diffusion pattern layer 26 may be diffused and scattered by the diffusion pattern layer 26.

The prism pattern layer 21P is disposed on a surface of the base layer 21B facing the liquid crystal panel 30. The prism pattern layer 21P includes a plurality of first unit prisms P1 extending in the y-axis direction. The plurality of first unit prisms P1 may be arranged in the x-axis direction. The prism pattern layer 21P may change a direction in which incident light travels to a direction close to a normal direction of the film surface, and may increase luminance at the center.

The prism film 22 is adhered to a side of the diffusion film 21 facing the liquid crystal panel 30. Referring to FIG. 2B, the prism film 22 includes a base layer 22B and a prism pattern layer 22P. The prism pattern layer 22P includes a plurality of second unit prisms P2 extending in the x-axis direction. The plurality of second unit prisms P2 may be arranged in the y-axis direction. The prism film 22 may change a direction in which light emitted from the diffusion film 21 travels to a direction close to a normal direction of the film surface.

The first unit prisms P1 of the diffusion film 21 have ridgelines R1 parallel to the y-axis direction, and the second unit prisms P2 of the prism film 22 have ridgelines R2 parallel to the x-axis direction. The ridgelines R1 of the first unit prisms P1 and the ridgelines R2 of the second unit prisms P2 may be perpendicular to each other. Accordingly, the light-collecting performance of the composite optical sheet 20 may be improved. Also, horizontal and vertical viewing angles of the screen of the LCD device 1 may be adjusted to appropriate angles.

Referring back to FIG. 2A, the microlens film 23 is adhered to a side of the prism film 22 close to the liquid crystal panel 30. The microlens film 23 includes a base layer 23B and a plurality of microlenses 23L having convex shapes. The microlens film 23 may refract incident light and emit the refracted light to the liquid crystal panel 30, and thus may cause the emitted light to have good viewing angle characteristics. Each of the prism film 22 and the microlens film 23 may be formed of an acrylic resin, an epoxy resin, or polyimide.

Figure 5A:
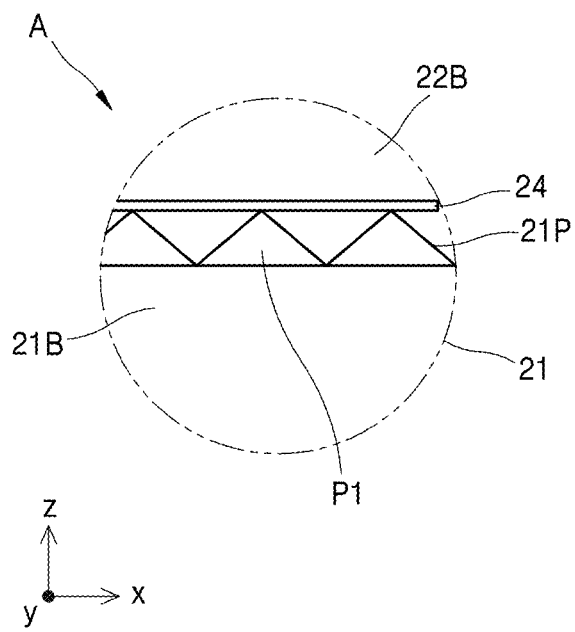
FIG. 5A is an enlarged view illustrating a portion A of FIG. 2A.

FIG. 5A is an enlarged view illustrating a portion A of FIG. 2A.

Referring to FIG. 5A, the diffusion film 21 and the prism film 22 are adhered to each other by an adhesive layer 24. That is, the prism pattern layer 21P of the diffusion film 21 is adhered to the base layer 22B of the prism film 22 by the adhesive layer 24. The adhesive layer 24 may be formed of a transparent resin such as an acrylic resin.

Figure 5B:
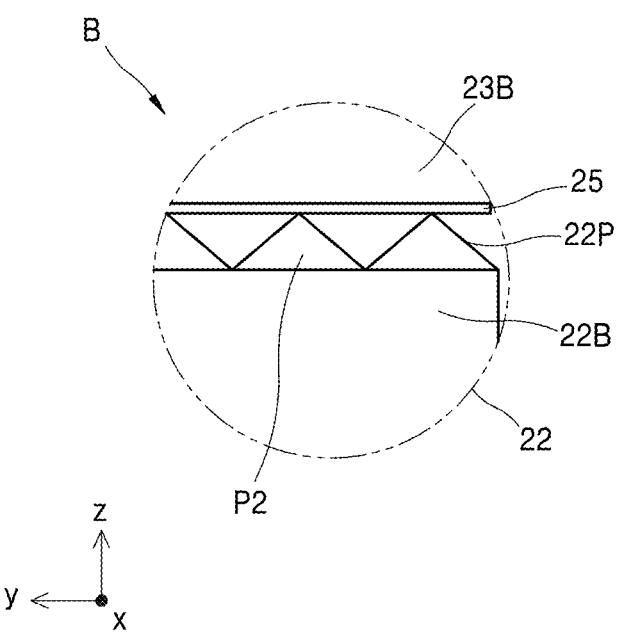
FIG. 5B is an enlarged view illustrating a portion B of FIG. 2B.

FIG. 5B is an enlarged view illustrating a portion B of FIG. 2B.

Referring to FIG. 5B, the prism film 22 and the microlens film 23 are adhered to each other by an adhesive layer 25. That is, the prism pattern layer 22P of the prism film 22 is adhered to the base layer 23B of the microlens film 23 by the adhesive layer 25. The adhesive layer 24 may be formed of a transparent resin such as an acrylic resin.

The diffusion film 21, the prism film 22, and the microlens film 23 are adhered to one another by the adhesive layers 24 and 25 to form the composite optical sheet 20. Accordingly, a thin design and a light weight of the composite optical sheet 20 may be ensured. Also, since a plurality of optical films are adhered to one another, a strength may be increased and thus ease of handling during a process of assembling the LCD device 1 may be increased.

Figure 6A:
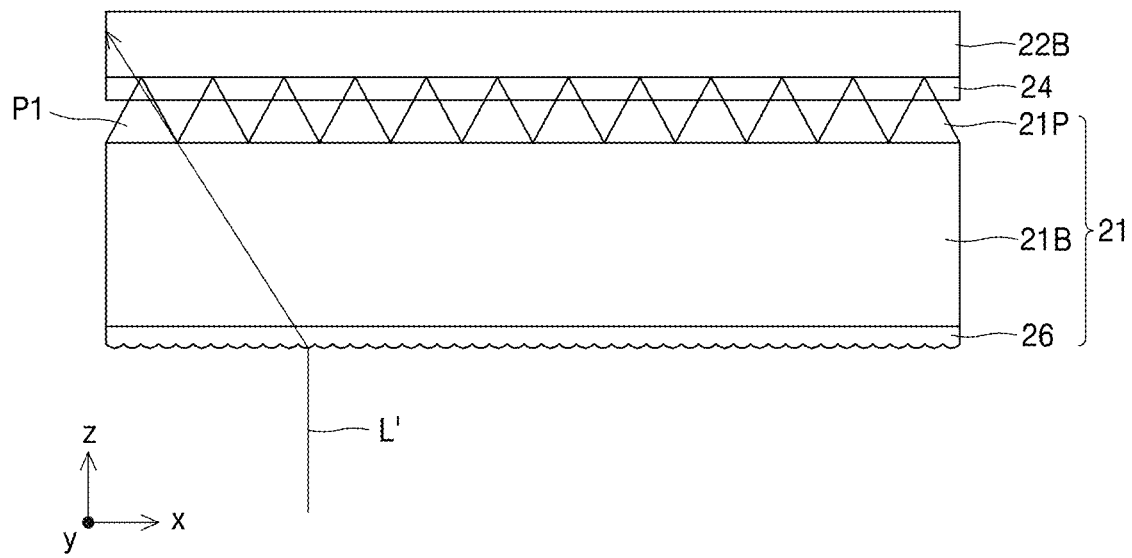
FIG. 6A is a cross-sectional view of the diffusion film according to an embodiment seen in the y-axis direction.

FIG. 6A is a cross-sectional view of the diffusion film 21 according to an embodiment seen in the y-axis direction.

Referring to FIG. 6A, the diffusion film 21 and the prism film 22 are adhered to each other by the adhesive layer 24. That is, the prism pattern layer 21P of the diffusion film 21 is adhered to the base layer 22B of the prism film 22 by the adhesive layer 24.

Light L' emitted from the surface light-emitting module 14 may be diffused and scattered by the diffusion pattern layer 26, and then may pass through the base layer 21B and may be incident on the prism pattern layer 21P. The base layer 21B, the prism pattern layer 21P, the adhesive layer 24, and the base layer 22B may each be formed of an optically transparent resin such as PET, PP, PC, or PMMA, and may have the same refractive index.

From among light incident on the prism pattern layer 21P, the light L' incident on a portion where the prism pattern layer 21P and the base layer 22B are adhered to each other by the adhesive layer 24 may not be emitted to the outside, that is, into air. Since the light L' passes through material layers having the same refractive index, refraction may not occur. Accordingly, the light L' may escape to the outside, instead of to the liquid crystal panel 30, thereby resulting in light loss.

Figure 6B:
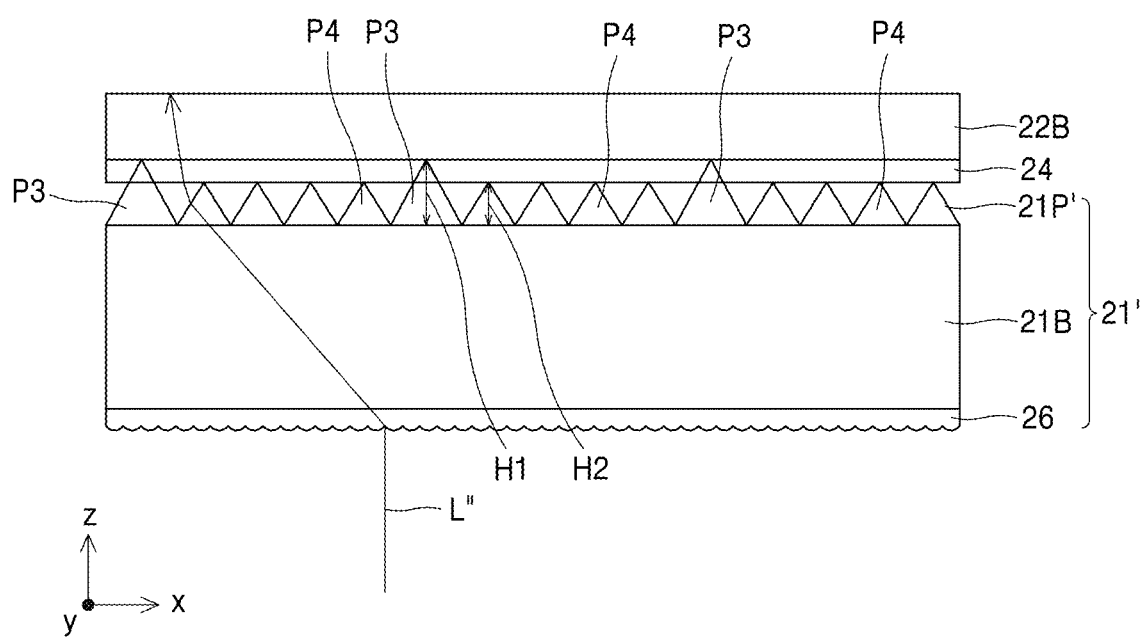
FIG. 6B is a cross-sectional view of a diffusion film according to another embodiment seen in the y-axis direction.

FIG. 6B is a cross-sectional view of a diffusion film 21' according to another embodiment seen in the y-axis direction.

Referring to FIG. 6B, the diffusion film 21' includes the base layer 21B, the diffusion pattern layer 26 disposed on a surface of the base layer 21B facing the surface light-emitting module 14, and a prism pattern layer 21P' formed on a surface of the base layer 21B facing the liquid crystal panel 30.

The base layer 21B and the diffusion pattern layer 26 may be the same as the base layer 21B and the diffusion pattern layer 26 described above, and thus an explanation thereof will not be given here.

The prism pattern layer 21P' includes a plurality of first prism patterns P3 having a first height H1 and a plurality of second prism patterns P4 having a second height H2. The first height H1 may be greater than the second height H2.

The first prism patterns P3 and the base layer 22B may be adhered to each other by the adhesive layer 24, and the second prism patterns P4 and the base layer 22B may not be adhered to each other by the adhesive layer 24. Also, the second prism patterns P4 may be spaced apart from the adhesive layer 24.

One or more second prism patterns P4 may be provided between the first prism patterns P3. For example, four second prism patterns P4 may be provided between the first prism patterns P3.

Light L" emitted from the surface light-emitting module 14 may be diffused and scattered by the diffusion pattern layer 26 of the diffusion film 21, and then may pass through the base layer 21B and may be incident on the prism pattern layer 21P'.

From among light incident on the prism pattern layer 21P', light incident on a portion where the first prism patterns P3 and the base layer 22B are adhered to each other by the adhesive layer 24 may not be emitted to the outside, that is, into the air.

In contrast, in the first prism patterns P3, light incident on a portion other than the portion where the first prism patterns P3 and the base layer 22B are adhered to each other by the adhesive layer 24 may be refracted. Also, when the light L" incident on the second prism patterns P4 is emitted to the outside, that is, into the air, refraction may occur due to a refractive index difference between the second prism patterns P4 and the air.

Accordingly, the prism pattern layer 21P' according to the present embodiment may reduce the number of prism patterns adhered to the base layer 22B by the adhesive layer 24, thereby minimizing light loss and preventing luminance from being reduced due to the adhesion.

Figure 7A:
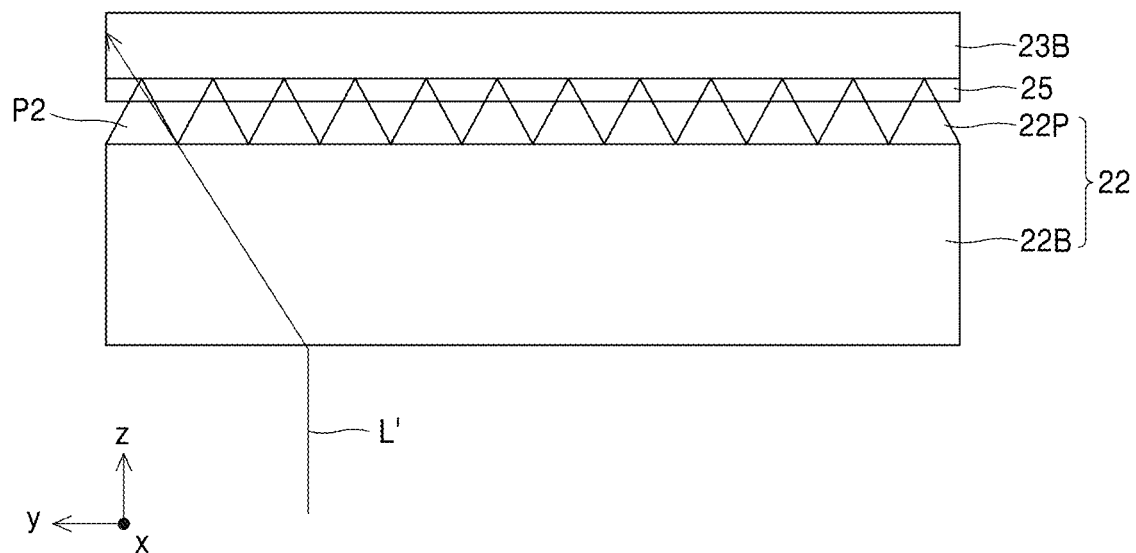
FIG. 7A is a cross-sectional view of a prism film according to an embodiment seen in the x-axis direction.

FIG. 7A is a cross-sectional view of the prism film 22 according to an embodiment seen in the x-axis direction.

Referring to FIG. 7, the prism film 22 and the microlens film 23 are adhered to each other by the adhesive layer 25. That is, the prism pattern layer 22P of the prism film 22 is adhered to the base layer 23B of the microlens film 23 by the adhesive layer 24.

The light L' emitted from the surface light-emitting module 14 may pass through the diffusion film 21, and then may pass through the base layer 22B and may be incident on the prism pattern layer 22P. The base layer 22B, the prism pattern layer 22P, the adhesive layer 25, and the base layer 23B may each be formed of an optically transparent resin such as PET, PP, PC, or PMMA, and may have the same refractive index.

From among light incident on the prism pattern layer 22P, the light L' incident on a portion where the prism pattern layer 22P and the base layer 23B are adhered to each other by the adhesive layer 25 may not be emitted to the outside, that is, into the air. Since the light L' passes through material layers having the same refractive index, refraction may not occur. Accordingly, the light L' may escape to the outside, instead of to the liquid crystal panel 30, thereby resulting in light loss.

Figure 7B:
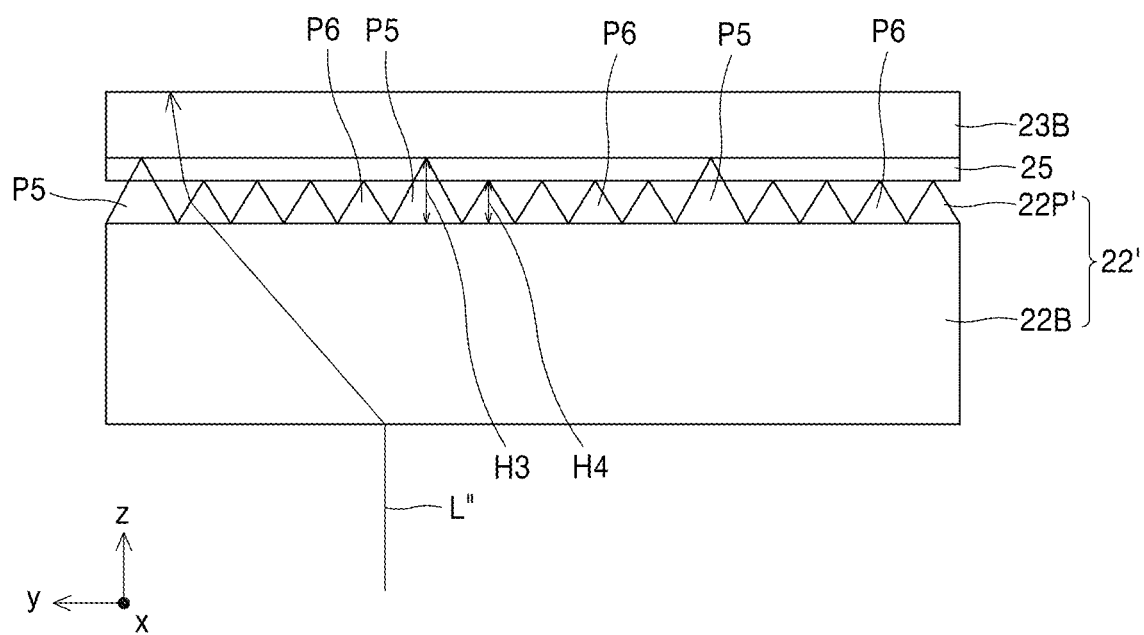
FIG. 7B is a cross-sectional view of a prism film according to another embodiment seen in the x-axis direction.

FIG. 7B is a cross-sectional view of a prism film 22' according to another embodiment seen in the x-axis direction.

Referring to FIG. 7B, the prism film 22' includes the base layer 22B and a prism pattern layer 22P' disposed on a surface of the base layer 22B facing the liquid crystal panel 30.

The base layer 22B may be the same as the base layer 22B described above, and thus an explanation thereof will not be given here.

The prism pattern layer 22P' includes a plurality of first prism patterns P5 having a first height H3 and a plurality of second prism patterns P6 having a second height H4. The first height H3 may be greater than the second height H4.

The first prism patterns P5 and the base layer 23B may be adhered to each other by the adhesive layer 25, and the second prism patterns P6 and the base layer 23B may not be adhered to each other by the adhesive layer 25. Also, the second prism patterns P6 may be spaced apart from the adhesive layer 25.

One or more second prism patterns P6 may be provided between the first prism patterns P5. For example, four second prism patterns P6 may be provided between the first prism patterns P5.

The light L'' emitted from the surface light-emitting module 14 may pass through the diffusion film 21, and then may pass through the base layer 22B and may be incident on the prism pattern layer 22P'.

From among light incident from the prism pattern layer 22P', light incident on a portion where the first prism patterns P5 and the base layer 23B are adhered to each other by the adhesive layer 25 may not be emitted to the outside, that is, into the air.

In contrast, in the first prism patterns P5, light incident on a portion other than the portion where the first prism patterns P5 and the base layer 23B are adhered to each other by the adhesive layer 25 may be refracted. Also, when the light L'' incident on the second prism patterns P6 is emitted to the outside, that is, into the air, refraction may occur due to a refraction index difference between the second prism patterns P6 and the air.

Accordingly, the prism pattern layer 22P' according to the present embodiment may reduce the number of prism patterns adhered to the base layer 23B, thereby minimizing light loss and preventing luminance from being reduced due to the adhesion.

Figure 8:
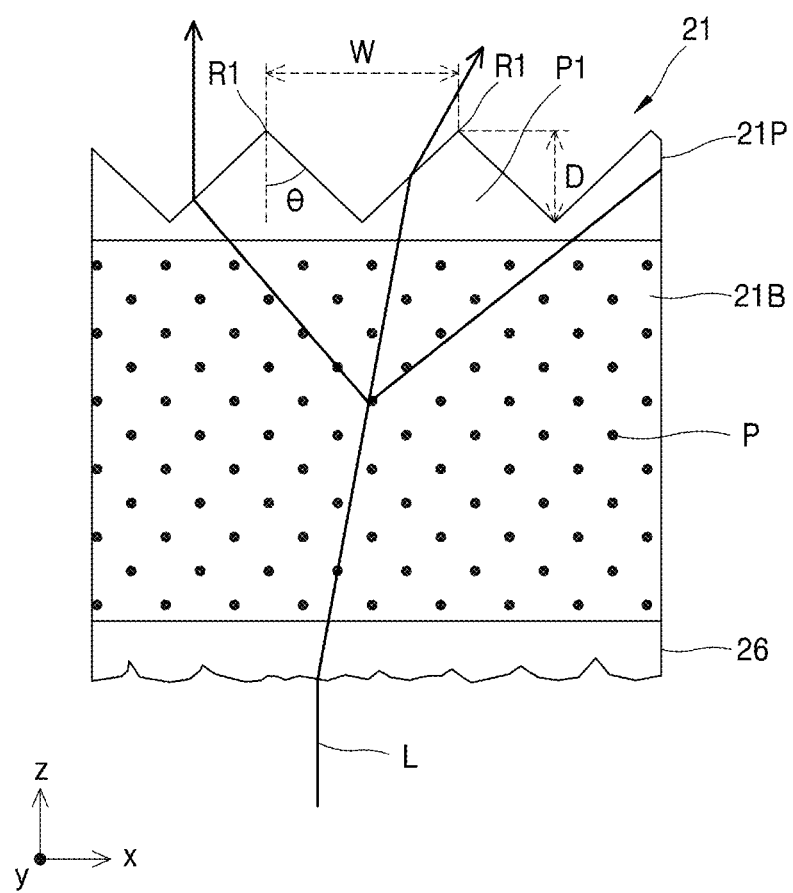
FIGS. 8 through 10 are views for explaining the diffusion film according to an embodiment.
Figure 9:
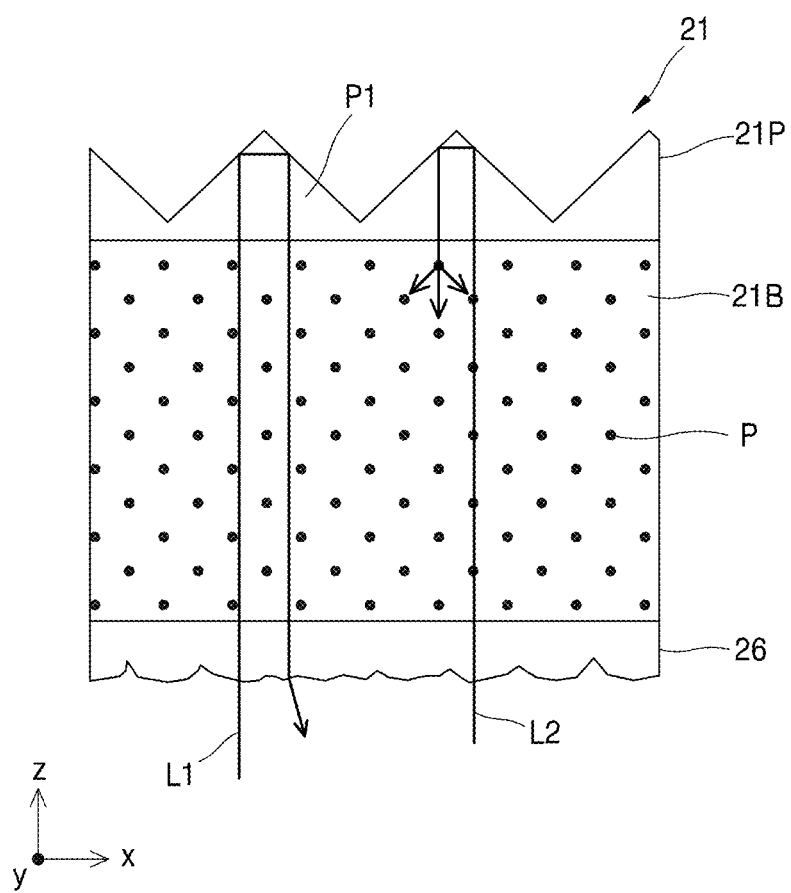
Figure 10:
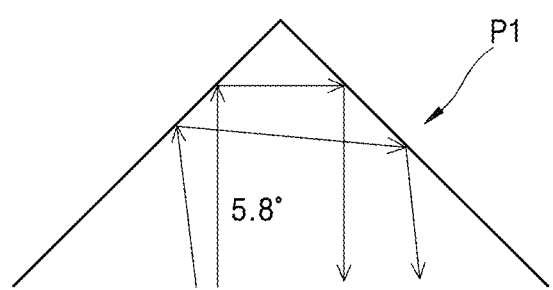

FIGS. 8 through 10 are views for explaining the diffusion film 21 according to an embodiment.

Referring to FIG. 8, each of the first unit prisms P1 of the diffusion film 21 may have a depth D ranging from 0.025 mm to 0.03 mm. That is, a length between an apex and a valley of a first unit prism P1 may range from 0.025 mm to 0.03 mm.

An apex angle of the first unit prism P1 which is an angle between one side of a triangular cross-section perpendicular to a first ridgeline R1 of the first unit prism P1 and a line passing through an apex of the triangular cross-section and perpendicular to a bottom side of the triangular cross-section may range from 88° to 94°. Also, an interval W between the ridgelines R1 of adjacent first unit prisms P1 may range from 0.04 mm to 0.06 mm.

Table 1 shows experimental results of an emitted light amount ratio (%) according to each emission angle when a prism angle θ changes from 43° to 47° by one degree.

TABLE 1

|  |  | Prism angle (θ) | | | | |
| --- | --- | --- | --- | --- | --- | --- |
|  |  | 43° | 44° | 45° | 46° | 47° |
| Emission angle | 38° | 51% | 79% | 79% | 80% | 79% |
|  | 39° | 21% | 74% | 78% | 78% | 78% |
|  | 40° | 5% | 50% | 63% | 77% | 77% |

TABLE 1-continued

|  | Prism angle (θ) | | | | |
| --- | --- | --- | --- | --- | --- |
|  | 43° | 44° | 45° | 46° | 47° |
| 41° | 6% | 20% | 33% | 67% | 76% |
| 42° | 7% | 3% | 10% | 41% | 70% |

In the composite optical sheet 20 used for the LCD device 1, in order to improve viewing angle characteristics, it is preferable to increase the amount of light emitted at 40° from a normal direction of a screen. Reviewing experimental results when an emission angle is 40° and the prism angle θ is 43°, an emitted light amount ratio is determined to be low. Also, when a case where the prism angle θ is 46° and a case where the prism angle θ is 47° are compared with each other, there is no change in an emitted light amount ratio. Accordingly, it may be preferable that the prism angle θ ranges from 44° to 47°.

Light L emitted from a light source is emitted by the lens 12 and is incident on the diffusion film 21. The incident light is diffused and scattered by the diffusion pattern layer 26.

The light scattered by the diffusion pattern layer 26 is incident on the base layer 21B. The light incident on the base layer 21B may be scattered again by the scattering particles P of the base layer 21B. The light scattered by the base layer 21B is incident on the prism pattern layer 21P.

Referring to FIG. 9, pieces of light L1 and L2 incident on the prism pattern layer 21P at an angle close to a normal direction of the film surface may be totally reflected from inclined surfaces of the first unit prisms P1 and may return back to original positions. For example, referring to FIG. 10, when the prism angle θ is 45°, light incident at a gradient of 5.8° from a normal direction of the film surface may be totally reflected from an inclined surface of the first unit prism P1.

Referring to FIG. 9, the light L2 totally reflected from the prism pattern layer 21P and returning to the base layer 21B may be scattered again by the scattering particles P. Also, part of the scattered light may return to the prism pattern layer 21P. The light L1 totally reflected from the prism pattern layer 21P, returning to the base layer 21B, and transmitted through the diffusion pattern layer 26 without being scattered by the scattering particles P may be reflected by the reflective sheet 13 (see FIG. 1) and may be incident again on the diffusion film 21. Such an operation may be repeatedly performed.

Referring to FIG. 8, light emitted from the prism pattern layer 21P is incident on the prism film 22. In the prism film 22, light reflected from inclined surfaces of the second unit prisms P2 may return to the diffusion film 21 to be scattered again, and light transmitted through the diffusion film 21 may be reflected again from the reflective sheet 13 (see FIG. 1), which may be repeatedly performed.

Light emitted from the prism film 22 may have a uniform luminance over the emitted film surface. Light emitted from the prism film 22 is incident on the microlens film 23. The microlens film 23 may refract incident light and emit the refracted light to the liquid crystal panel 30 by using an optical refraction effect of a microlens 23L, thereby making it possible for the light emitted to the liquid crystal panel 30 to have good viewing angle characteristics.

A thickness of the base layer 21B including the scattering particles P may be hundreds of μm. Since a length of an optical path increases as a thickness of the base layer 21B increases, the amount of light directly transmitted through the diffusion film 21 without being scattered by the diffusion film 21 may be reduced. Accordingly, luminance non-uniformity of light emitted from the light source 11 may be reduced.

Figure 11:
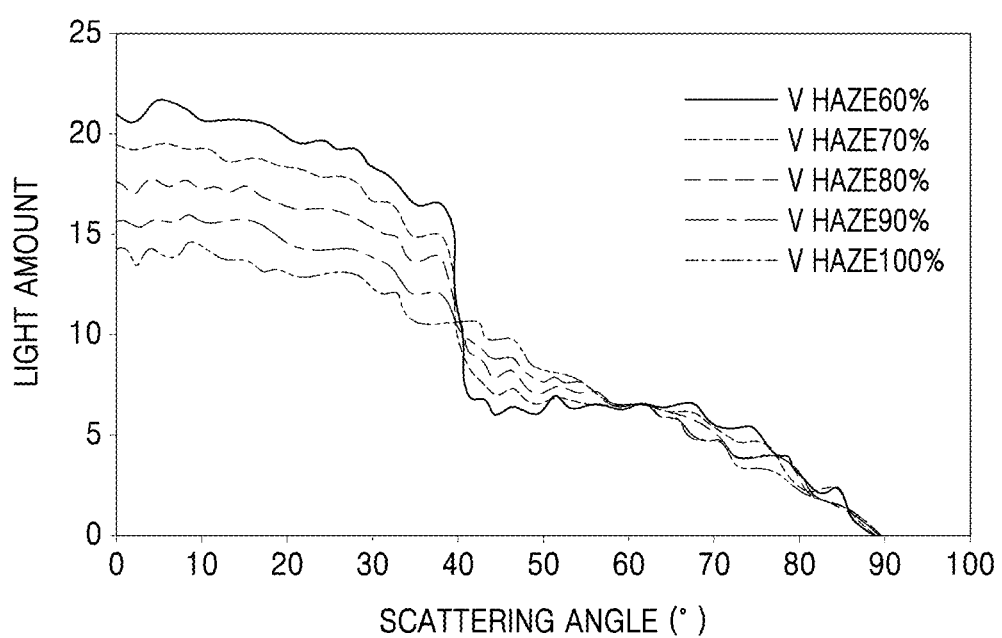
FIG. 11 is a graph illustrating a relationship between a scattering angle and a light amount in the diffusion film having different haze values.

FIG. 11 is a graph illustrating a relationship between a scattering angle and a light amount in the diffusion film 21 having different haze values.

Referring to FIG. 11, a solid line indicates a haze value of 60%, a dotted line indicates a haze value of 70%, a dashed line indicates a haze value of 80%, a dash-dot line indicates a haze value of 90%, and a dash-dot-dot line indicates a haze value of 100%. When a light amount moderately changes as a scattering angle increases, luminance non-uniformity decreases. When a haze value is reduced to 70% or 60%, a light amount is sharply changed at a scattering angle of about 40°. Accordingly, a haze value of the diffusion film 21 may be equal to or greater than 80% at which a light amount is not sharply changed at a scattering angle of about 40°.

Figure 12:
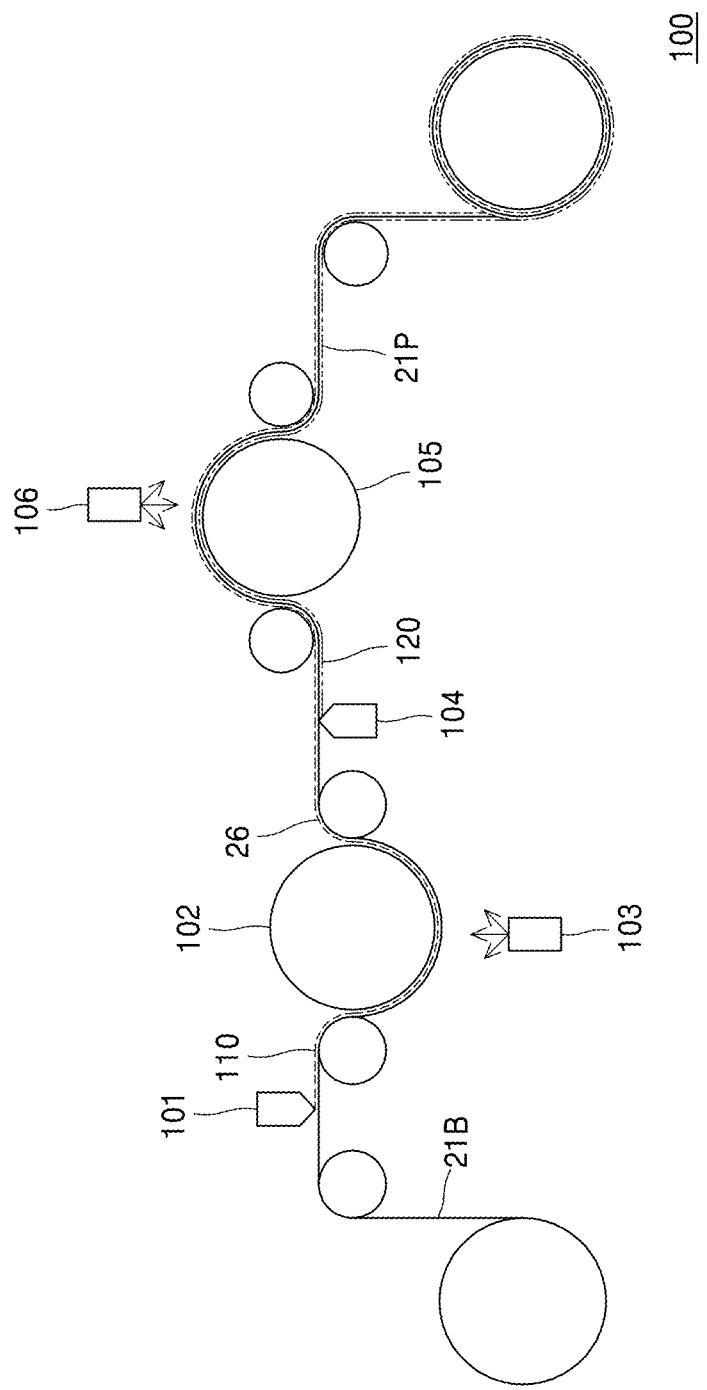
FIG. 12 is a view for explaining an apparatus for manufacturing the composite optical sheet according to an embodiment.

FIG. 12 is a view for explaining an apparatus 100 for manufacturing the composite optical sheet 20 according to an embodiment.

Referring to FIG. 12, the apparatus 100 includes a first UV curable resin supply unit 101, a first forming unit 102, a first UV light emitting device 103, a second UV curable resin supply unit 104, a second forming unit 105, and a second UV light emitting device 106.

The base layer 21B may be wound into a roll shape to form a disk. The base layer 21B may include the scattering particles P. A first curable resin 110 is applied from the first UV curable resin supply unit 101 to a first surface of the base layer 21B that is released from the disk to form the diffusion pattern layer 26. The first UV curable resin 110 may not include scattering particles.

Next, in a state where the first forming unit 102 is compressed onto the first UV curable resin 110, UV light is emitted by the first UV light emitting device 103. A shape obtained by inverting a diffusion pattern of the diffusion pattern layer 26 is provided on the first forming unit 102. Accordingly, the first UV curable resin 110 is cured and the diffusion pattern layer 26 on a surface of which a diffusion pattern is formed is formed.

Next, a second UV curable resin 120 is applied from the second UV curable resin supply unit 104 to a second surface that is opposite to the first surface of the base layer 21B. The second UV curable resin 120 may not include scattering particles.

Next, in a state where the second forming unit 105 is compressed onto the second UV curable resin 120, UV light is emitted by the second UV light emitting device 106. A shape obtained by inverting a prism pattern of the prism pattern layer 21P is provided on the second forming unit 105. Accordingly, the second UV curable resin 120 is cured and the prism pattern layer 21P on a surface of which a prism pattern is formed is formed.

The prism pattern layer 21P may include the plurality of first unit prisms P1 that extend in the y-axis direction, and the plurality of first unit prisms P1 may be arranged in the x-axis direction. The diffusion film 21 including the diffusion pattern layer 26 that is disposed on the first surface of the base layer 21B and the prism pattern layer 21P that is disposed on the second surface of the base layer 21B is wound into a roll shape to form a disk of the diffusion film 21. As such, since patterns on both surfaces of the diffusion film 21 may be manufactured by using a roll-to-roll method, low cost manufacturing may be achieved.

Next, the prism film 22 and the microlens film 23 are sequentially adhered by using an adhesive layer to the prism pattern layer 21P of the diffusion film 21 to form the composite optical sheet 20. Since the diffusion film 21 has a film shape, the diffusion film 21 may be adhered to the prism film 22 and the microlens film 23 by using a roll-to-roll method, and thus a composite sheet may be obtained at low costs.

The prism film 22 is adhered to the prism pattern layer 21P so that the first ridgelines R1 of the first unit prisms P1 of the prism pattern layer 21P and the second ridgelines R2 of the second unit prisms P2 of the prism film 22 are perpendicular to each other. Also, a surface of the prism film 22 on which a prism pattern is not formed is adhered to a surface of the diffusion film 22 on which the prism pattern layer 21P is formed. Also, a surface of the microlens film 23 on which a microlens pattern is not formed is adhered to a surface of the prism film 22 on which the prism pattern is formed.

Next, the composite optical sheet 20 may be cut into a predetermined shape so that the diffusion pattern layer 26 faces the surface light-emitting module 14 and the microlens film 23 faces the liquid crystal panel 30. Through the above process, the LCD device 1 may be manufactured.

Figure 13:
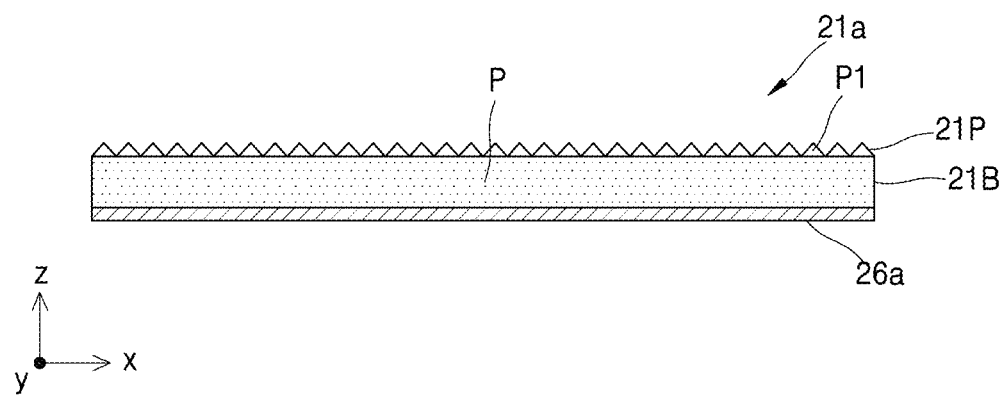
FIG. 13 is a cross-sectional view of a diffusion film according to another embodiment seen in the y-axis direction.

FIG. 13 is a cross-sectional view of a diffusion film 21a used for a composite optical sheet according to another embodiment seen in the y-axis direction.

Referring to FIG. 13, a diffusion pattern layer 26a of the diffusion film 21a may include scattering particles. Luminance uniformity may be further improved by further dispersing the scattering particles in the diffusion pattern layer 26a.

The diffusion pattern layer 26a may be formed by applying a resultant structure obtained by dispersing scattering particles in the first UV curable resin 110 to the base layer 21B and emitting UV light in a state where the first forming unit 102 is compressed.

Figure 14:
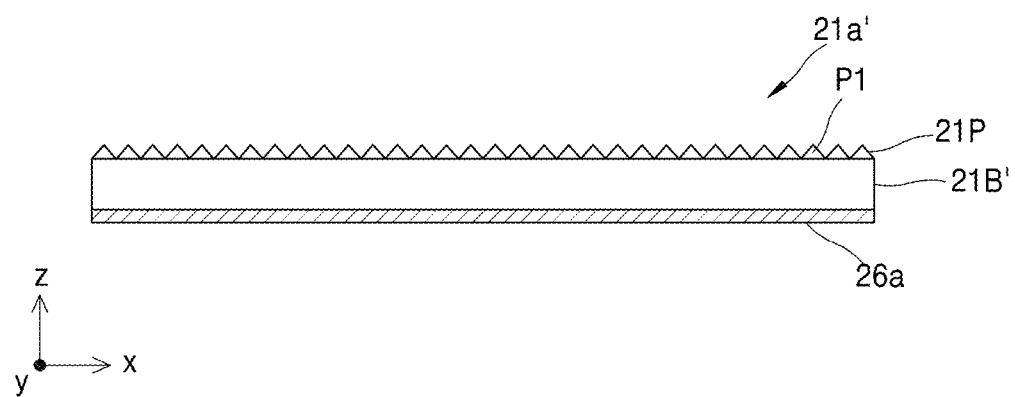
FIG. 14 is a cross-sectional view of a diffusion film according to another further embodiment seen in the y-axis direction.

FIG. 14 is a cross-sectional view of a diffusion film 21a' used for a composite optical sheet according to another further embodiment seen in the y-axis direction.

Referring to FIG. 14, the diffusion film 21a' does not include scattering particles in a base layer 21B', and includes scattering particles in the diffusion pattern layer 26a. In order to manufacture the diffusion film 21a', a disk of the base layer 21B' that is transparent and does not include scattering particles may be used. The diffusion pattern layer 26a may be formed by applying the first UV curable resin 110 in which scattering particles are dispersed to a first surface of the base layer 21B' and emitting UV light in a state where the first forming unit 102 is compressed onto the first UV curable resin 110. A prism pattern is formed on a second surface of the base layer 21B' as described above. As such, the diffusion film 21a' may be formed by using a roll-to-roll method at low costs.

Figure 15:
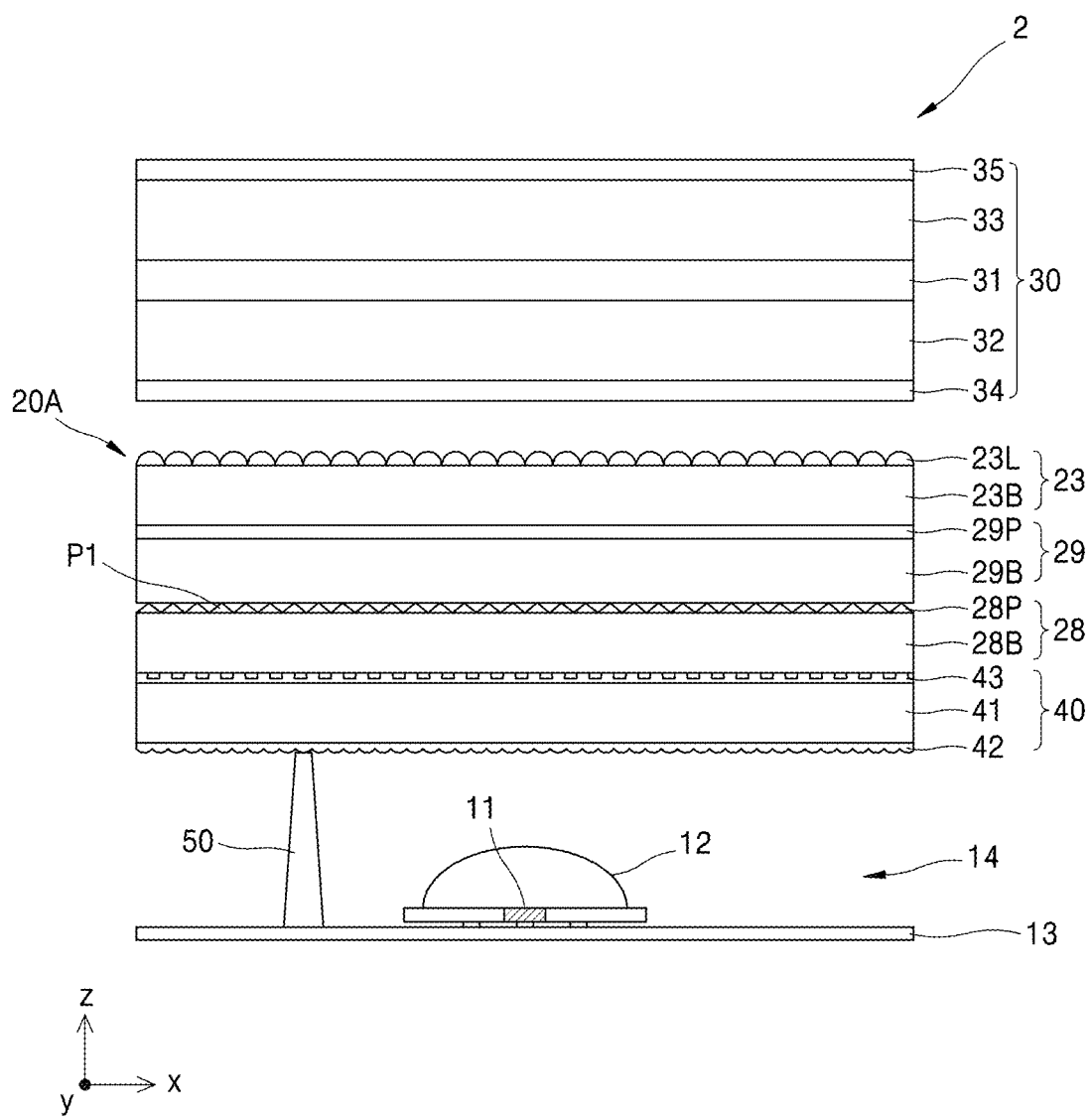
FIG. 15 is a cross-sectional view of an LCD device according to another embodiment seen in the y-axis direction.
Figure 16A:
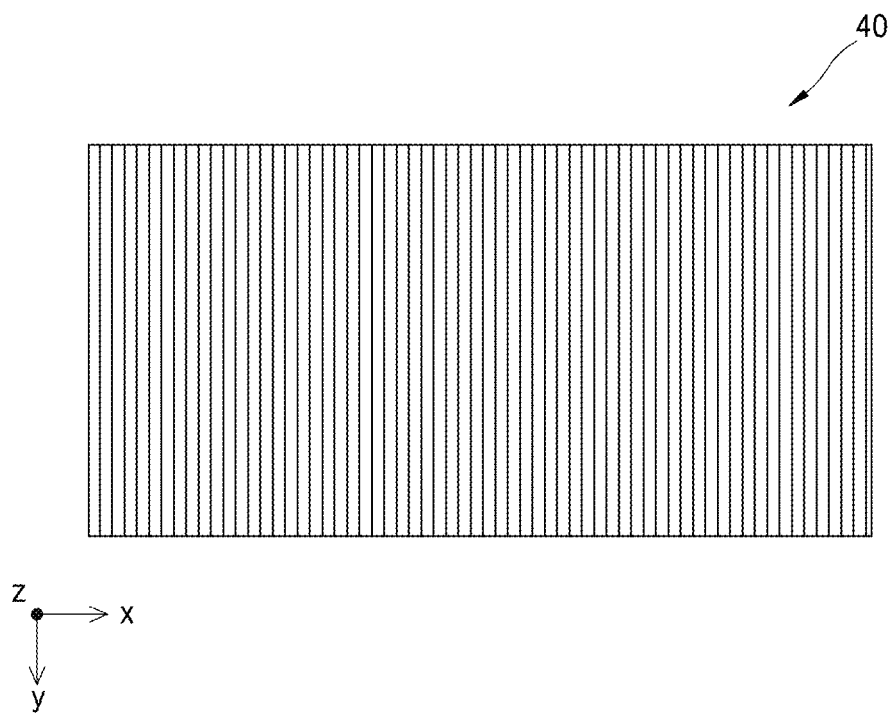
FIG. 16A is a plan view of a diffusion film according to an embodiment, in the LCD device according to another embodiment.
Figure 16B:
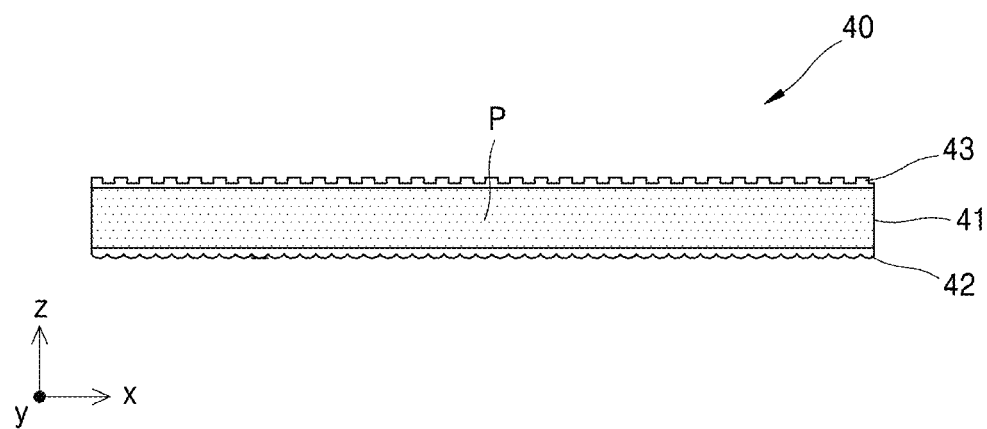
FIG. 16B is a cross-sectional view of the diffusion film according to an embodiment seen in the y-axis direction, in the LCD device according to another embodiment.

FIG. 15 is a cross-sectional view of an LCD device 2 according to another embodiment seen in the y-axis direction. FIG. 16A is a plan view of a diffusion film 40 according to an embodiment, in the LCD device 2 according to another embodiment. FIG. 16B is a cross-sectional view of the diffusion film 40 according to an embodiment seen in the y-axis direction, in the LCD device 2 according to another embodiment.

Referring to FIG. 15, the LCD device 2 includes the liquid crystal panel 30, the surface light-emitting module 14, a composite optical sheet 20A, and a support 50.

In the following drawings, a direction parallel to a longitudinal direction of a screen (a top surface of the liquid crystal panel 30 close to an observer) of the LCD device 2 is referred to as an x-axis direction and a direction perpendicular to the x-axis direction is referred to as a y-axis direction. Also, a direction perpendicular to the screen of the LCD device 2 is referred to as the z-axis direction. Also, in the z-axis direction, a side of the liquid crystal panel 30 close to the observer is an observer side and a side of the liquid crystal panel 30 close to the surface light-emitting module 14 is a rear side. A film surface refers to a surface of a film constituting the composite optical sheet 20A, that is, any of the diffusion film 40, a first prism film 28, a second prism film 29, and the microlens film 23, in an in-plane direction.

The liquid crystal panel 30 and the surface light-emitting module 14 may be the same as the liquid crystal panel 30 and the surface light-emitting module 14 of FIG. 1, and thus an explanation thereof will not be given.

The composite optical sheet 20A includes the diffusion film 40, the first prism film 28, the second prism film 29, and the microlens film 23, and the diffusion film 40, the first prism film 28, the second prism film 29, and the microlens film 23 are sequentially stacked from the rear side to the observer side.

The diffusion film 40 may diffuse light emitted from the surface light-emitting module 14 inside the diffusion film 40. The diffusion film 40 includes a base layer 41, a diffusion pattern layer 42 disposed on a surface of the base layer 41 facing the surface light-emitting module 14, and a diffraction pattern layer 43 disposed on a surface of the base layer 41 facing the liquid crystal panel 30.

The base layer 41 may be formed of an optically transparent resin such as PET, PP, PC, or PMMA, and may transmit incident light. Also, referring to FIG. 16B, the base layer 41 may include the plurality of scattering particles P therein. The scattering particles P may be formed of an acrylic resin or a styrene resin. The scattering particles P formed in the base layer 41 may emit light incident on the base layer 41 as light having high uniformity and low luminance non-uniformity.

The diffusion pattern layer 42 is disposed on a surface of the base layer 41 facing the surface light-emitting module 14. The diffusion pattern layer 42 may be the same as the diffusion pattern layer 26 of FIG. 2A, and thus an explanation thereof will not be given.

The diffraction pattern layer 43 is disposed on a surface of the base layer 41 facing the liquid crystal panel 30. Referring to FIGS. 16A and 16B, the diffraction pattern layer 43 may include linear uneven patterns that are arranged in parallel. The linear uneven patterns may extend in the y-axis direction, and the plurality of linear uneven patterns may be arranged in the x-axis direction. Referring to FIG. 16B, in the diffraction pattern layer 43, concave portions and convex portions having linear shapes may be alternately arranged.

Referring back to FIG. 15, the first prism film 28 is adhered to a surface of the diffusion film 40 facing the liquid crystal panel 30. That is, the diffraction pattern layer 43 and a base layer 28B may be adhered. The first prism film 28 includes the base layer 28B and a prism pattern layer 28P. The prism pattern layer 28P includes a plurality of unit prisms extending in the y-axis direction. The plurality of unit prisms may be arranged in the x-axis direction. The prism pattern layer 28P may change a direction in which incident light travels to a direction close to a normal direction of the film surface, and may increase luminance at the center.

The second prism film 29 is adhered to a surface of the first prism film 28 facing the liquid crystal panel 30. The second prism film 29 includes a base layer 29B and a prism pattern layer 29P. The prism pattern layer 29P includes a plurality of unit prisms extending in the x-axis direction. The plurality of unit prisms may be arranged in the y-axis direction.

The unit prisms of the first prism film 28 have first ridgelines parallel to the y-axis direction, and the unit prisms of the second prism film 29 have second ridgelines parallel to the x-axis direction. The first ridgelines and the second ridgelines may be perpendicular to each other. Accordingly, the light-collecting performance of the composite optical sheet 20A may be improved. Also, horizontal and vertical viewing angles of the screen of the LCD device 2 may be adjusted to appropriate angles.

The microlens film 23 is adhered to a side of the second prism film 29 facing the liquid crystal panel 30. The microlens film 23 includes the base layer 23B and the plurality of microlenses 23L having convex shapes. The microlens film 23 may refract incident light and emit the refracted light to the liquid crystal panel 30, and thus may cause the emitted light to have good viewing angle characteristics. Each of the first prism film 28, the second prism film 29, and the microlens film 23 may be formed of an acrylic resin, an epoxy resin, or polyimide.

The support 50 may be provided between the surface light-emitting module 14 and the composite optical sheet 20A. The support 50 may have, but is not limited to, a cylindrical shape, a rectangular parallelepiped shape, or a truncated cone shape having a trapezoidal cross-section. The support 50 may be formed of a transparent resin such as an acrylic resin. One surface of the support 50 may contact the reflective sheet 13, and the other surface of the support 50 may contact the diffusion pattern layer 42. When an external impact is applied to the LCD device 2, the support 50 may absorb the external impact and may prevent the LCD device 2 from being bent or damaged.

Figure 17:
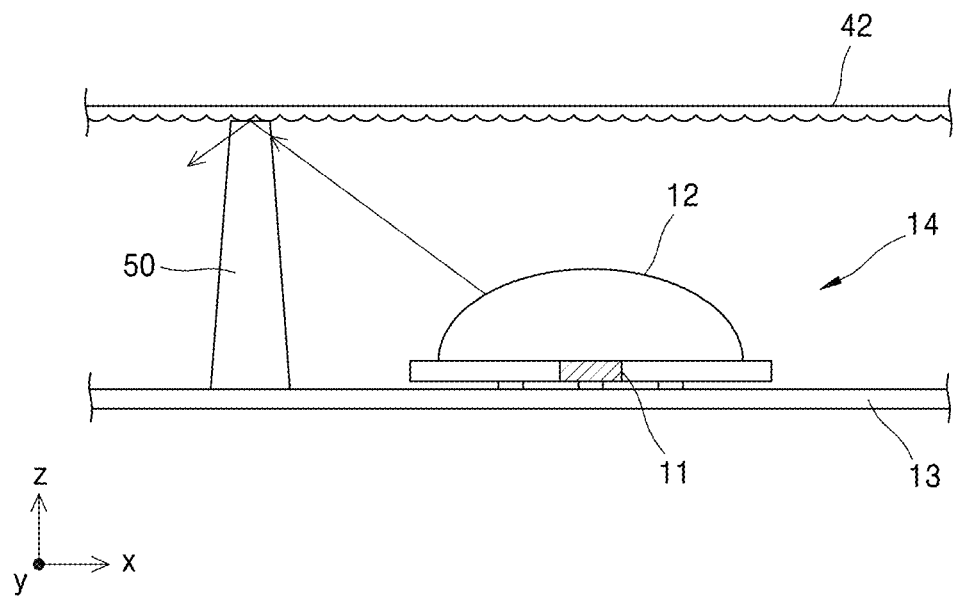
FIG. 17 is an enlarged cross-sectional view illustrating a part of the LCD device according to another embodiment.

FIG. 17 is an enlarged cross-sectional view illustrating a part of the LCD device 2 according to another embodiment.

Referring to FIG. 17, light emitted from the light source 11 of the surface light-emitting module 14 and incident at a predetermined angle through a side surface of the support 50 may be totally reflected from one surface of the support 50 that contacts the diffusion pattern layer 42. Accordingly, since light may not be incident on a portion of the diffusion film 40 right over the support 50, a shadow may be formed by the support 50 close to the liquid crystal panel 30.

Figure 18:
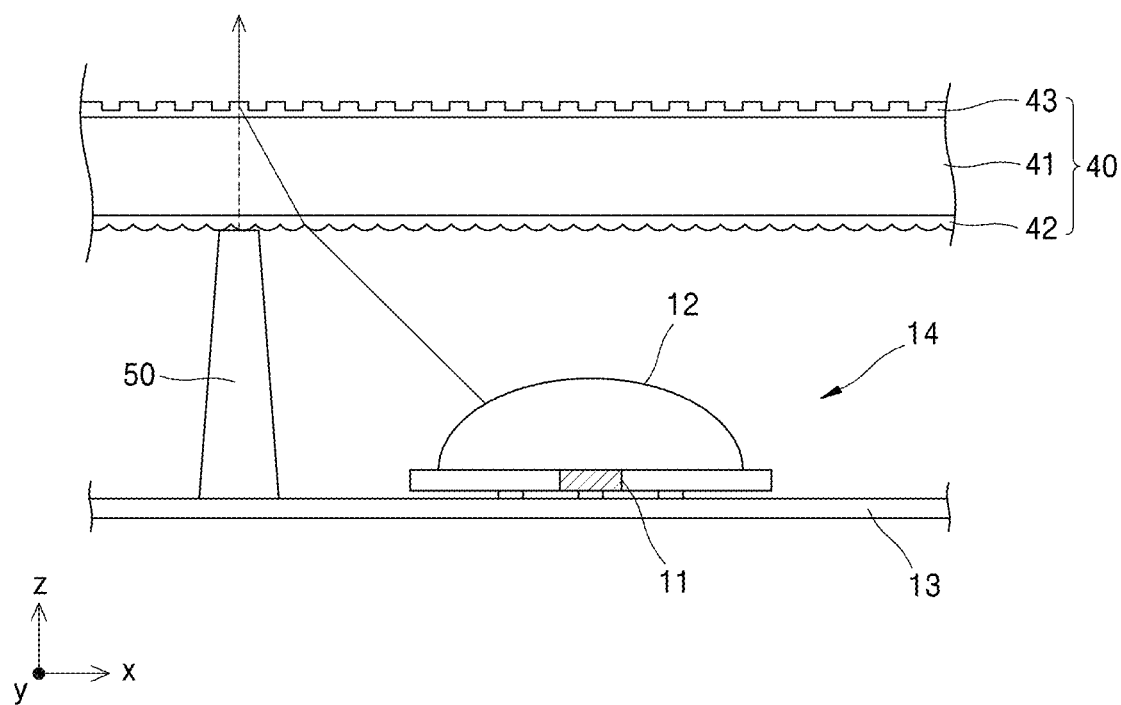
FIG. 18 is a view for explaining a diffraction pattern layer of the diffusion film according to an embodiment, in the LCD device according to another embodiment.

FIG. 18 is a view for explaining the diffraction pattern layer 43 of the diffusion film 40 according to an embodiment, in the LCD device 2 according to another embodiment.

Referring to FIG. 18, part of light emitted from the light source 11 of the surface light-emitting module 14 and diffused and scattered by the diffusion pattern layer 42 may pass through the base layer 41 and may be incident on the diffraction pattern layer 43. The light may be refracted by the diffraction pattern layer 43 and may be emitted in a direction perpendicular to one surface of the support 50 that contacts the diffusion pattern layer 42. Accordingly, a shadow may not be formed by the support 50 close to the liquid crystal panel 30.

Figure 19A:
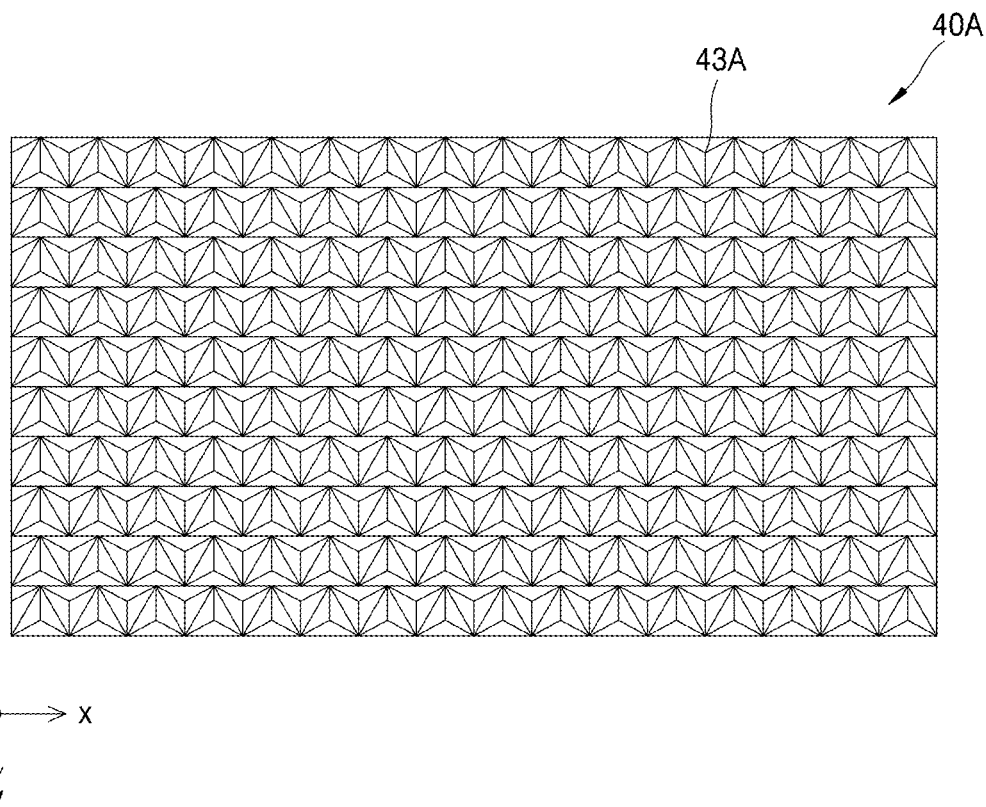
FIG. 19A is a plan view of a diffusion film according to another embodiment, in the LCD device according to another embodiment.
Figure 19B:
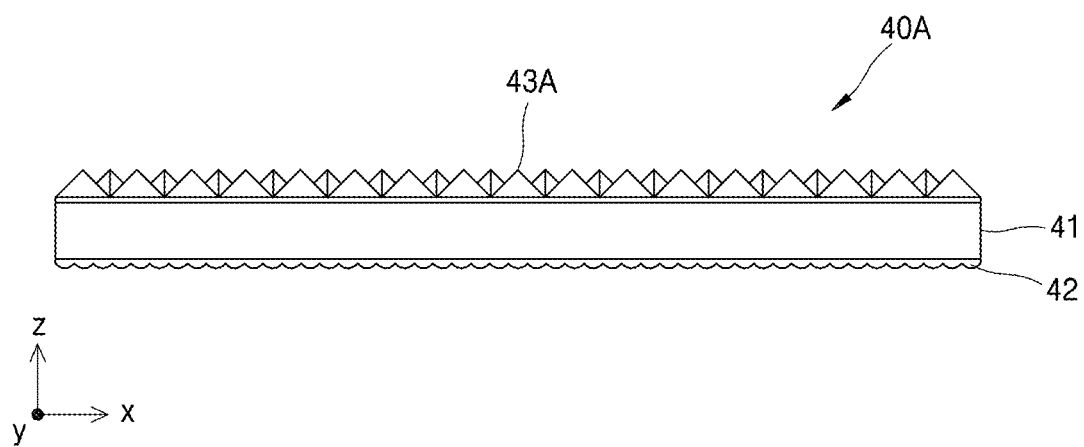
FIG. 19B is a cross-sectional view of the diffusion film according to another embodiment seen in the y-axis direction, in the LCD device according to another embodiment.

FIG. 19A is a plan view of a diffusion film 40A according to another embodiment, in the LCD device 2 according to another embodiment. FIG. 19B is a cross-sectional view of the diffusion film 40A according to another embodiment seen in the y-axis direction, in the LCD device 2 according to another embodiment. The diffusion film 40 is another embodiment of the diffusion film 40 according to an embodiment.

Referring to FIGS. 19A and 19B, the diffusion film 40A includes the base layer 41, the diffusion pattern layer 42 disposed on a surface of the base layer 41 facing the surface light-emitting module 14, and a diffraction pattern layer 43A disposed on a surface of the base layer 41 facing the liquid crystal panel 30. The base layer 41 and the diffusion pattern layer 42 may be the same as the base layer 41 and the diffusion pattern layer 42 of FIG. 15, and thus an explanation thereof will not be given.

The diffraction pattern layer 43A may include a plurality of trigonal pyramid patterns. The plurality of trigonal pyramid patterns may be alternately arranged in the x-axis direction on the base layer 41. Bottom surfaces of the trigonal pyramid patterns may be formed to have equilateral triangles, and the equilateral triangles of the bottom surfaces of the trigonal pyramid patterns adjacent in the x-axis direction may have a phase difference of 180° when seen in the z-axis direction. Due to the arrangement, the base layer 41 of the diffusion film 40A may be completely covered by the diffraction pattern layer 43A when seen in the z-axis direction.

Figure 20A:
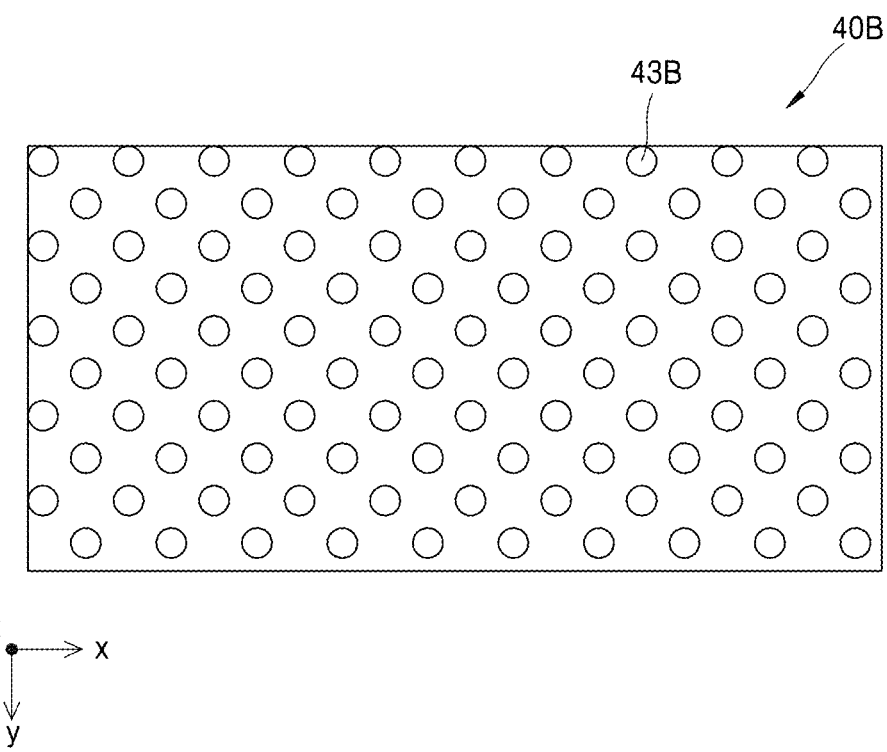
FIG. 20A is a plan view of a diffusion film according to another further embodiment, in the LCD device according to another embodiment.
Figure 20B:
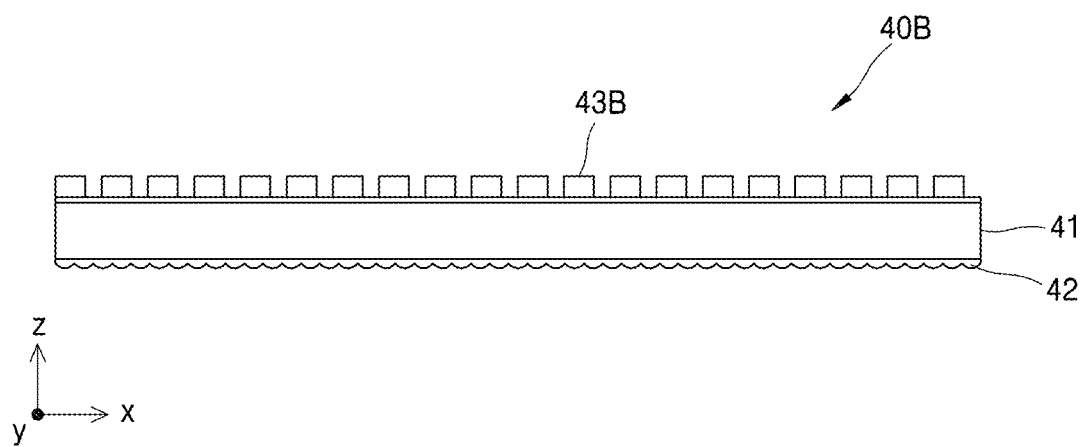
FIG. 20B is a cross-sectional view of the diffusion film according to another further embodiment seen in the y-axis direction, in the LCD device according to another embodiment.

FIG. 20A is a plan view of a diffusion film 40B according to another further embodiment, in the LCD device 2 according to another embodiment. FIG. 20B is a cross-sectional view of the diffusion film 40B according to another further embodiment seen in the y-axis direction, in the LCD device 2 according to another embodiment.

Referring to FIGS. 20A and 20B, the diffusion film 40B includes the base layer 41, the diffusion pattern layer 42 disposed on a surface of the base layer 41 facing the surface light-emitting module 14, and a diffraction pattern layer 43B disposed on a surface of the base layer 41 facing the liquid crystal panel 30. The base layer 41 and the diffusion pattern layer 42 may be the same as the base layer 41 and the diffusion pattern layer 42 of FIG. 15, and thus an explanation thereof will not be given.

The diffraction pattern layer 43B may include a plurality of cylindrical patterns. The cylindrical patterns may be arranged at predetermined intervals. Adjacent rows of cylindrical patterns each arranged at predetermined intervals along the x-axis may be misaligned with each other.

While the present invention has been particularly shown and described with reference to exemplary embodiments thereof, it will be understood by one of ordinary skill in the art that various changes in form and details may be made therein without departing from the spirit and scope of the present invention as defined by the following claims. Hence, it will be understood that the embodiments described above do not limit the scope of the invention. For example, each component described in a single type may be executed in a distributed manner, and components described distributed may also be executed in an integrated form.

The scope of the present invention is indicated by the claims rather than by the detailed description of the invention, and it should be understood that the claims and all modifications or modified forms drawn from the concept of the claims are included in the scope of the present invention.

The invention claimed is:

1. A liquid crystal display (LCD) device comprising:
a liquid crystal panel;
a surface light-emitting module;
a base layer disposed between the liquid crystal panel and the surface light-emitting module;
a diffusion pattern layer disposed on a surface of the base layer facing the surface light-emitting module and configured to diffuse light incident from the surface light-emitting module;
a prism pattern layer disposed on a surface of the base layer facing the liquid crystal panel and comprising a plurality of first unit prisms; and
a prism film adhered to the prism pattern layer and comprising a plurality of second unit prisms,
wherein an angle between one side of a triangular cross-section perpendicular to a first ridgeline of each of the plurality of first unit prisms and a line passing through an apex of the triangular cross-section and perpendicular to a bottom side of the triangular cross-section ranges from 44° to 47°,
wherein the base layer, the diffusion pattern layer, and the prism pattern layer form a diffusion film, and
wherein a haze value of the diffusion film is equal to or greater than 80%.

2. The LCD device of claim 1, wherein the base layer comprises a plurality of scattering particles.

3. The LCD device of claim 1, wherein first ridgelines of the plurality of first unit prisms and second ridgelines of the plurality of second unit prisms are perpendicular to each other.

4. The LCD device of claim 1, wherein the diffusion pattern layer comprises a plurality of scattering particles.

5. The LCD device of claim 1, wherein the plurality of first unit prisms have a depth ranging from 0.025 mm to 0.03 mm.

6. The LCD device of claim 1, wherein an interval between first ridgelines of the plurality of first unit prisms ranges from 0.04 mm to 0.06 mm.

7. The LCD device of claim 1, wherein the diffusion pattern layer comprises a plurality of uneven portions.

8. The LCD device of claim 1, wherein the surface light-emitting module comprises at least one from among an edge-type surface light-emitting module and a direct-type surface light-emitting module.

9. The LCD device of claim 1, further comprising an adhesive layer configured to adhere the plurality of first unit prisms and the prism film.

10. The LCD device of claim 9, wherein the prism pattern layer comprises a plurality of first prism patterns having a first height and a plurality of second prism patterns having a second height,
wherein the first height is greater than the second height.

11. The LCD device of claim 10, wherein the plurality of first prism patterns are adhered to the prism film by the adhesive layer, and
the plurality of second prism patterns are provided between the plurality of first prism patterns.

12. The LCD device of claim 1, further comprising a microlens film adhered to the prism film and comprising a plurality of microlenses having convex shapes.

13. The LCD device of claim 12, further comprising a second adhesive layer configured to adhere the plurality of second unit prisms and the microlens film.

14. The LCD device of claim 13, wherein the prism film comprises a plurality of third prism patterns having a third height and a plurality of fourth prism patterns having a fourth height,
wherein the third height is greater than the fourth height.

15. The LCD device of claim 14, wherein the plurality of third prism patterns are adhered to the microlens film by the second adhesive layer, and
the plurality of fourth prism patterns are provided between the plurality of third prism patterns.

16. The LCD device of claim 15, wherein the plurality of fourth prism patterns are provided between the plurality of third prism patterns without being directly adhered to the second adhesive layer.

17. A liquid crystal display (LCD) device comprising:
- a liquid crystal panel;
- a surface light-emitting module;
- a diffusion film disposed between the liquid crystal panel and the surface light-emitting module;
- a first prism film adhered to a surface of the diffusion film facing the liquid crystal panel and comprising a plurality of first unit prisms;
- a second prism film adhered to a surface of the first prism film facing the liquid crystal panel and comprising a plurality of second unit prisms; and
- a support provided between the surface light-emitting module and the diffusion film, wherein the diffusion film comprises:
- a base layer;
- a diffusion pattern layer disposed on a first surface of the base layer facing the surface light-emitting module; and
- a diffraction pattern layer disposed on a second surface of the base layer facing the liquid crystal panel, wherein the diffraction pattern layer comprises linear uneven patterns, wherein the linear uneven patterns comprise a plurality of first surfaces parallel to the second surface of the base layer and a plurality of second surfaces parallel to the second surface of the base layer, the plurality of second surfaces being alternatingly disposed between the plurality of first surfaces at a position farther away from the second surface of the base layer than the plurality of first surfaces, and wherein an angle between one side of a triangular cross-section perpendicular to a first ridgeline of each of the plurality of first unit prisms and a line passing through an apex of the triangular cross-section and perpendicular to a bottom side of the triangular cross-section ranges from 44° to 47°.

18. The LCD device of claim 17, further comprising a microlens film adhered to the second prism film and comprising a plurality of microlenses having convex shapes.

19. The LCD device of claim 17, wherein the diffraction pattern layer further comprises at least one from among a plurality of cylindrical patterns and a plurality of trigonal pyramid patterns that are arranged in parallel.

* * * * *